July 8, 1969  K. W. GOODSON  3,454,238
LIFTING-JET-BODY AIRCRAFT CONFIGURATION
Filed Oct. 25, 1967  Sheet 1 of 3
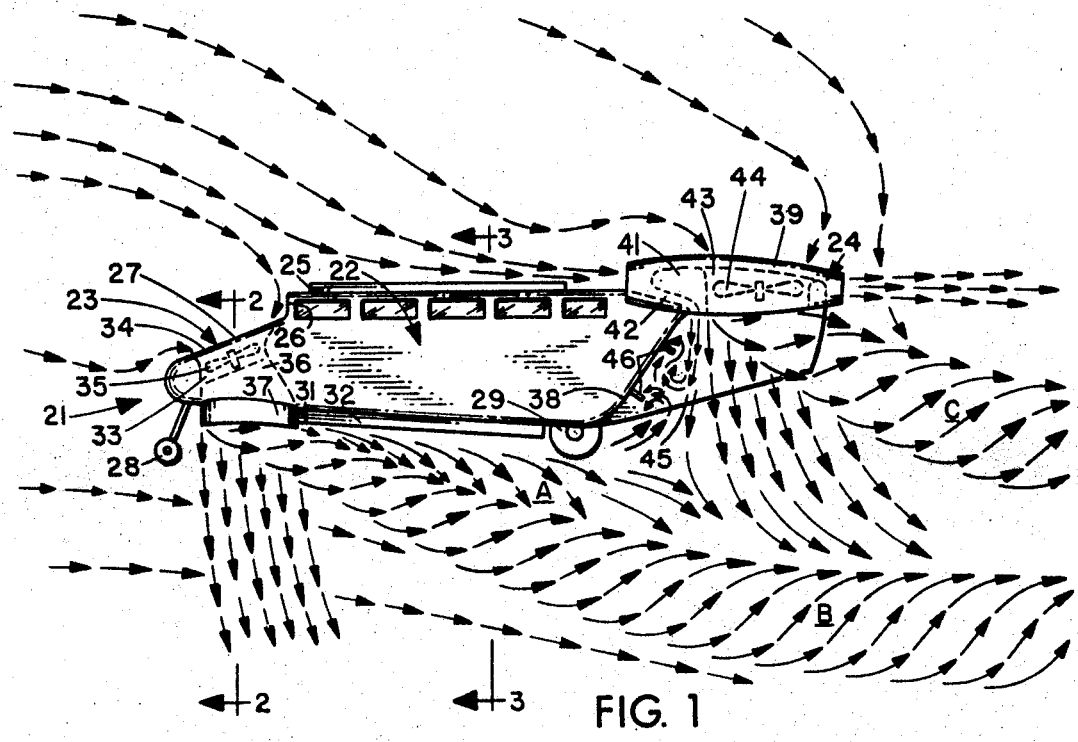
FIG. 1
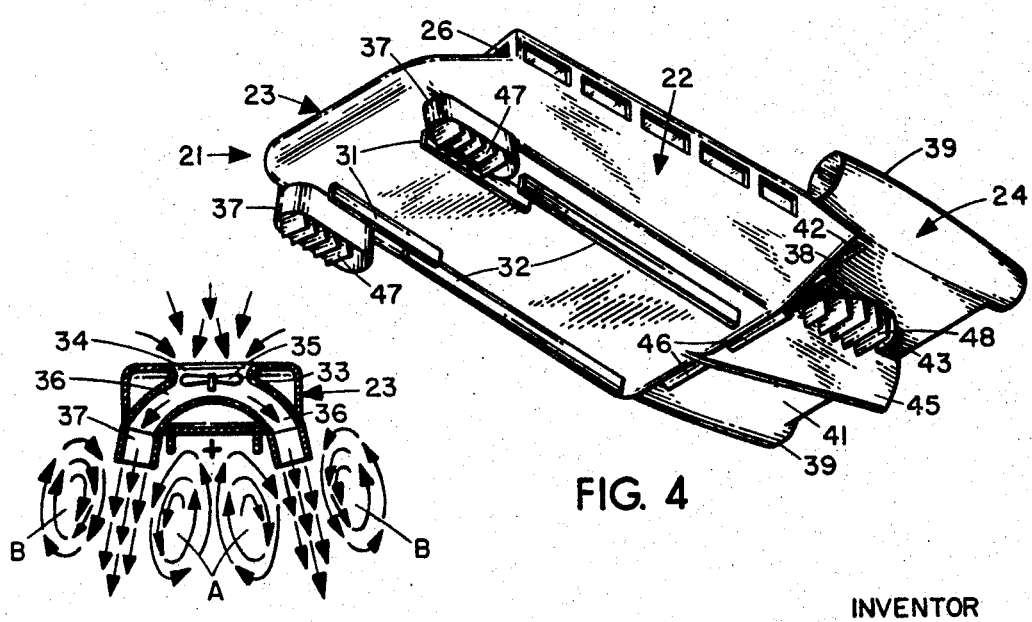
FIG. 2
FIG. 4
INVENTOR
KENNETH W. GOODSON
BY J. M. Carson, Jr.
ATTORNEY

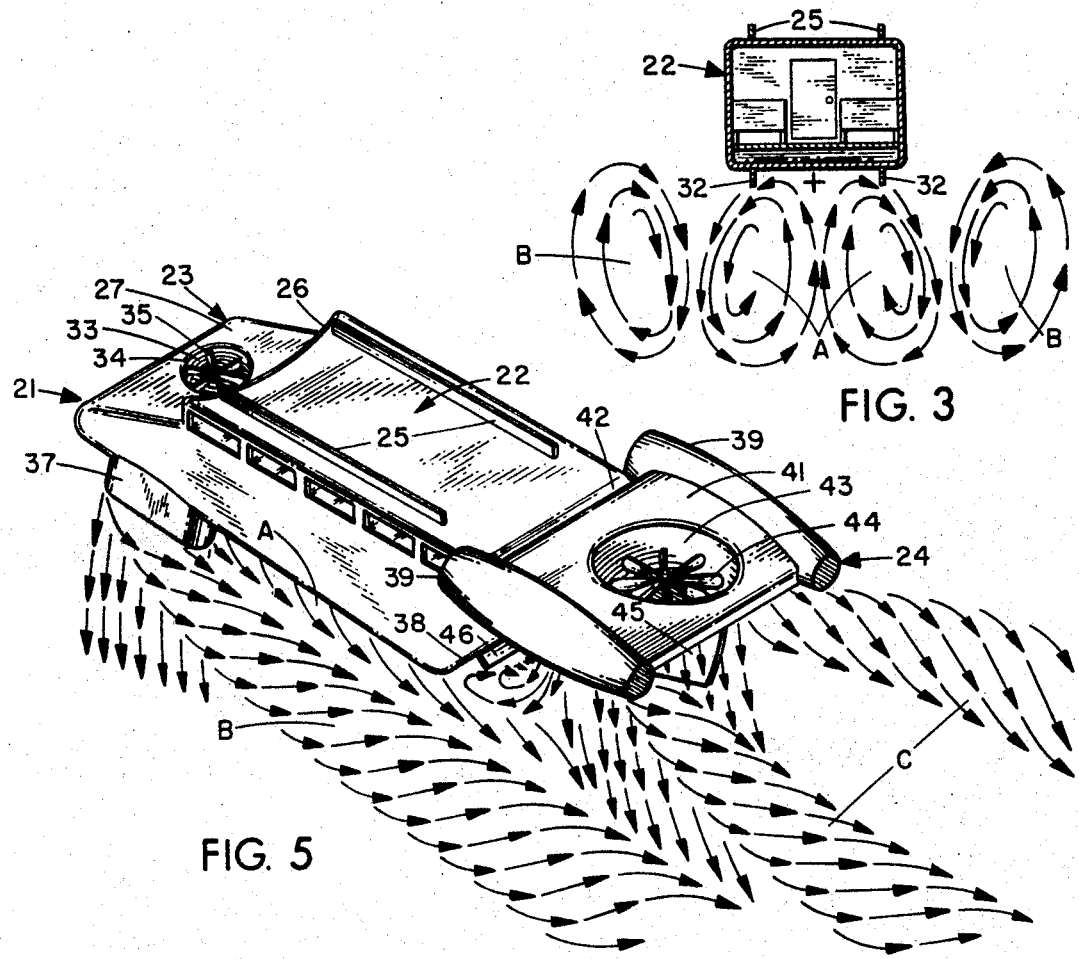
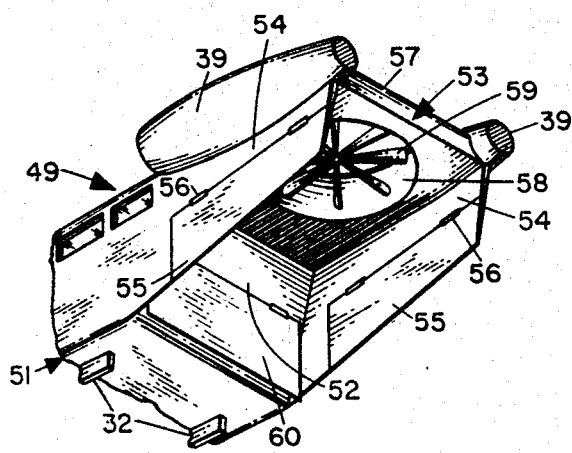
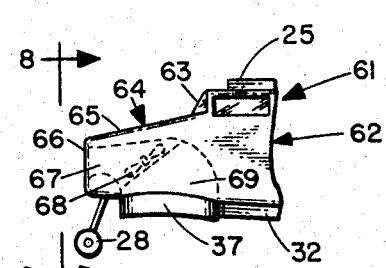

July 8, 1969  K. W. GOODSON  3,454,238
LIFTING-JET-BODY AIRCRAFT CONFIGURATION
Filed Oct. 25, 1967  Sheet 3 of 3

INVENTOR
KENNETH W. GOODSON

BY J. M. Carson, Jr.
ATTORNEY

United States Patent Office 3,454,238
Patented July 8, 1969

3,454,238
LIFTING-JET-BODY AIRCRAFT
CONFIGURATION
Kenneth W. Goodson, Rte. 4, Box 335, Robanna Shores,
Yorktown, Va. 23490
Filed Oct. 25, 1967, Ser. No. 678,040
Int. Cl. B64d 27/20; B64c 29/00, 15/00
U.S. Cl. 244—12          13 Claims

ABSTRACT OF THE DISCLOSURE

An aircraft including a box-like body having a flat downwardly and rearwardly sloping lower surface, a chisel-shaped nose section carrying a forward lifting fan, and a rear lifting fan and motor assembly cantilevered rearwardly from the upper rear extremity of the aircraft body. Flow through the forward lifting fan is discharged through outwardly laterally directed right and left longitudinally elongated forward jet exits rotated azimuthly with respect to each other to an optimum position. At least one ventral fin, which may carry a control surface, extends rearwardly from the aircraft body beneath the rear lifting fan and motor assembly. Operating power for each lifting fan is suitably transmitted thereto from each of a pair of motors carried by the rear lifting fan and motor assembly; each motor also being directly useable for forward aircraft propulsion. The aircraft body carries strakes for air and vortex flow optimization.

---

This invention relates generally to a vehicle capable of three dimensional movement through a fluid medium, and more particularly to an aircraft of the type having vertical and/or short takeoff and landing capabilities.

Present and continuing population growth, both in the United States and abroad, taken with the established trend towards the concentration of an ever increasing proportion of the total population in relatively small metropolitan areas, is becoming a matter of concern to those responsibe for the rapid transportation of persons and the goods they require. Transportation officials and others having responsibilities in this area, pointing out the need for rapid movement of people and goods between suburban areas and city centers, cities and towns situated in the same general area, airports and city centers, farms and markets, and the like, believe that the means presently utilized in handling this traffic, such as automobiles, trucks, busses, trains, conventional aircraft, and the like, are now overburdened and will become more so in the years to come.

The increased use of air transportation in the alleviation of this problem appears to be clearly indicated in that it is potentially faster and further in that it will not contribute to the foreseeable increase in surface traffic congestion. Since conventional fixed wing aircraft must operate from airports, it is considered that they will be of limited value in short haul operations due to the time involved in moving people and goods to and from the airports. Various V/STOL (Vertical and Slow Take-Off and Landing) aircraft configurations, accordingly, have been investigated to determine their capabilities in the movement of passengers and freight over short distances and have shown some promise in this area, although they are generally more efficient over relatively large distances. Most of these V/STOL aircraft configurations have been found to be inefficient for flight conditions from hovering to fairly high transition speeds, requiring unduly high power expenditure at relatively slow speeds.

The shortcomings of these V/STOL aircraft configurations clearly emphasize the desirability of providing a configuration for an aerial vehicle in which the load is carried largely by some power device such as lifting propellors, ducted propellors, lifting fans, lifting jets, and the like; eliminating the need for transporting superfluous aerodynamic lifting surface weights and adverse aerodynamic loadings over distances where they do not improve the load carrying capabilities of the aircraft and in many cases reduce the same. The efforts of those working along these lines have resulted in aircraft configurations such as that shown, by way of example, in U.S. Patent No. 3,184,183 granted on May 18, 1965, to Frank N. Piasecki. The aerodynamic characteristics of such aerial vehicle configurations, however, leave much to be desired. The present invention stems from further efforts to improve the aerodynamic characteristics of such aerial vehicle configurations as well as to provide an aerial vehicle arranged to interiorly carry a substantial payload of passengers or freight.

Accordingly, an object of the present invention is the provision of an aerial vehicle of the vertical or short takeoff and landing type adapted to efficiently and economically transport passengers and freight over relatively short distances.

Another object of the instant invention is the provision of an aerial vehicle of the type wherein lift forces are produced by forward and aft ducted lifting fans and having a body specifically contoured and jet exits specifically arranged to minimize the adverse effects of the vortices generated by the interaction of the lifting fan discharge flows and the flow of air over the moving vehicle.

Still another object of the present invention is the provision of an aerial vehicle of the type wherein lift forces are produced by forward and aft lifting fans powered by each of a plurality of motors also arranged to assist in propelling the vehicle forwardly through the air.

According to the present invention, the foregoing and other objects are attained by providing an aerial vehicle in which the disposition of ducted lifting fans and the jet exits therefor cooperates with the specific contouring of the aircraft body for augmenting lift while obviating the aerodynamic penalties usually associated therewith. More specifically, the aircraft configuration includes a somewhat box-like body having a substantially flat lower surface sloping somewhat downwardly from front to rear for increasing lift; the body preferably further having a substantially vertically disposed, rearwardly curving, cabin windshield at the upper forward end of the cabin, as well as a chisel-shaped nose section having a substantially flat upper surface sloping downwardly from the cabin windshield towards the nose of the aircraft. The nose section of the aircraft includes a forward lifting fan preferably having the air inlet on the sloping upper surface thereof; the contour of the cabin windshield improving the efficiency of the flow of air thereinto. The flow of air through the forward lifting fan is discharged through essentially longitudinally elongated left and right forward jet exits extended by shields beyond the aircraft body in a substantially downwardly direction; the discharge through the right and left forward jet exits also being outwardly laterally directed with respect to the body plane of symmetry. The right and left forward jets are also rotated azimuthly with respect to each other to an optimum position. The inner vortices generated beneath the aircraft body by the interaction of the inner-faces of the forward air jets with the airstream react on the lower surface of the body to produce positive pressures thereon for lift augmentation; the lower surface of the body carrying longitudinal fences or strakes for optimizing these vortices. The rear portion of the aircraft body preferably includes a substantially flat transom-like aft end sloping upwardly and rearwardly from the rear extremity of the lower surface of the body towards the rear extremity of the substantially flat uppper surface thereof. An assembly carrying a ducted rear lifting fan cantilevered substantially aft of the body and further carrying motor means along the left and right edges thereof for powering the forward and rear lifting fans and for propelling the aircraft forwardly is interconnected with the rear upper extremity of the body and extends rearwardly therefrom. The upper surface of the rear lifting fan and motor assembly is raised above the upper surface of the body and contoured to reduce air pressures acting on the fan inlet surfaces for increased lift. Lift is also preferably augmented by the provision of a slot between the upper surface of the body and the lower surface of the rear lifting fan and motor assembly forward of the rear lifting fan circular jet exit, and fences are provided on the aft end of the body for breaking up the vortex induced by the interaction of the flow of the rear lifting fan and the slot with that of the main stream flow past the aft end of the body and to partially convert negative pressures to more positive pressures. At least one ventral fin preferably dividing the rear lifting fan circular jet extends rearwardly from the aft end of the body and below the lower surface of the rear lifting fan and motor assembly and may carry suitable control surfaces. Suitable means also interlink each of the aircraft motors with each of the lifting fans whereby the lifting fans may be operated by either or both of the motors.

A more complete appreciation of the invention and many of the attendant advantages thereof will be readily apparent as the same becomes better understood by reference to the following detailed description when considered in connection with the accompanying drawings wherein:

FIG. 1 is a side elevational view of a preferred embodiment of the aircraft configuration according to the present invention showing the flow of the airstream thereover and somewhat schematically indicating the shape of the vortices generated by the interaction of the airstream and the aircraft lifting jets;

FIG. 2 is a sectional, elevational view of the preferred embodiment of the aircraft according to the instant invention, taken along the line 2—2 of FIG. 1;

FIG. 3 is another sectional, elevational view of the preferred embodiment of the aircraft according to the present invention, taken along the line 3—3 of FIG. 1;

FIG. 4 is a perspective view of the preferred embodiment of the aircraft according to the instant invention showing the lower surfaces thereof;

FIG. 5 is another perspective view of the preferred embodiment of the aircraft according to the present invention showing the upper surfaces thereof and further somewhat schematically indicating the shape of the vortices generated by the interaction of the airstream and the aircraft lifting jets at a forward speed;

FIG. 6 is a perspective view of an alternative rear end configuration of the aircraft according to the present invention;

FIG. 7 is a side elevational view of an alternative nose section for the aircraft according to the instant invention;

Figure 9:
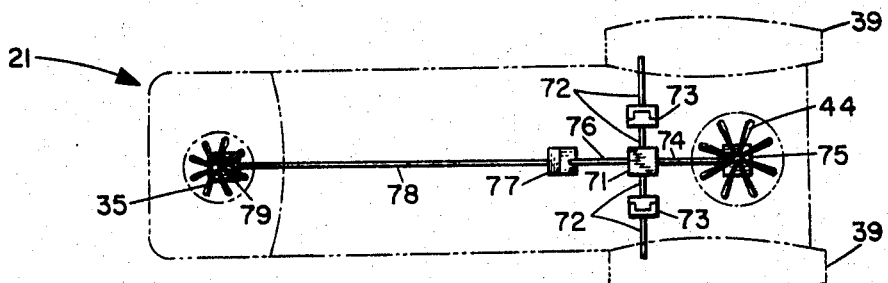
FIG. 9 is a plan view of a system for interconnecting the aircraft motors with the lifting fans by shaft and gearbox means.

Referring now more particularly to the drawings, wherein like reference numerals designate the same or identical parts throughout the several views, and more specifically to FIG. 1, there is shown an aircraft of the vertical or short takeoff and landing type, generally designated by the reference numeral 21. Aircraft 21 includes a substantially box-like body section, generally designated by the reference numeral 22; a nose section, generally designated by the reference numeral 23; and a rear lifting fan and motor assembly, generally designated by the reference numeral 24. The upper surface of aircraft body section 22 is substantially flat and is substantially level when aircraft 21 is in a normal flight attitude, and carries a longitudinal strake or fence 25 disposed near each of the side edges thereof and extending along a considerable portion of the length thereof for the purpose set forth hereinafter. The forward end of the upper surface of aircraft body section 22 terminates at a rearwardly arcuate, vertically disposed cabin windshield 26 extending vertically downwardly towards the upper rear extremity of the aircraft nose section 23.

Aircraft nose section 23 is preferably substantially chisel-shaped; having a substantially flat upper surface 27 sloping downwardly and forwardly from the lower extremity of the cabin windshield 26 towards the rounded nose of aircraft 21. The under surface of the aircraft nose section 23 is coplanar with the under surface of the aircraft body section 22; the under surfaces of these two sections of aircraft 21 sloping rearwardly and downwardly from the rounded nose of aircraft 21 towards the lower rear extremity of the aircraft body section 22. The aircraft 21 is provided with conventional tricycle type landing gear including a nose wheel 28 situated at the forward end of the aircraft on about the plane of symmetry thereof and a pair of main wheels 29 situated near the lower rear extremity of the aircraft body section 22, as illustrated in FIG. 1; a main wheel 29 being disposed near each of the vertical sides of the aircraft body section 22. Although a showing of the aircraft landing gear has been omitted in the remaining views of the drawings, with the exception of FIG. 7, solely for the purpose of illustrative clarity, it is to be understood that such landing gear would be required in the practice of the present invention. The under surface of aircraft 21 between the nose thereof and the lower rear extremity of the body section 22 thereof also carries longitudinally disposed fences or strakes 31 and 32 for the purpose set forth hereinafter.

Aircraft nose section 23 includes a forward lifting fan duct 33 prefereably having a substantially circular air inlet 34 leading from the sloping upper surface 27 of aircraft nose section 23 beyond a forward lifting fan 35 preferably mounted a relatively short distance below surface 27 and rotatable in a plane substantially parallel thereto. The forward lifting fan duct 33, at a point somewhat below lifting fan 35, is divided into right and left air discharge conduits 36 leading to right and left forward jet exists situated, by virtue of the use of the tubular jet exit shields 37, some distance beneath the lower surface of nose section 23 of aircraft 21 and substantially in the plane of each of the vertical sides of aircraft 21. Each of the jet exit shields 37 is essentially longitudinally elongated and is further inclined with respect to the aircraft plane of symmetry to direct the forward lifting jets in a somewhat laterally outward direction and at the optimum azimuth angle with respect to the body centerline, as well as downwardly to obtain desirable results, as more fully set forth hereinafter, and as particularly shown in FIG. 2.

Aircraft body section 22 includes a substantially flat transom-like aft end 38 sloping upwardly and rearwardly from the rear extremity of the lower surface thereof towards the rear extremity of the upper surface thereof at an angle of about 50° measured from the horizontal. The rear lifting fan and motor assembly 24 is situated in the vicinity of the intersection of the rear extremity of the upper surface of the aircraft body section 22 and the upper extremity of the aft end 38 thereof and includes propulsion motors 39, which may be of the reaction type as illustrated in the drawings, mounted substantially in the plane of the upper surface of aircraft body section 22 at each of the vertical sides thereof. About the forward third of the length of each motor 39 is positioned forwardly of the rear extremity of the aircraft body section 22 and is connected to the vertical sides thereof; the remainder of the length of each motor 39 being cantilevered aft of the aircraft body section 22, as shown in FIGS. 1, 3, and 4. Assembly 24 further includes a somewhat airfoil-like plane section 41 extending between and secured to the motors 39; the leading edge of plane section 41 being disposed somewhat forwardly of the rear extremity of aircraft body section 22 and spaced a distance thereabove, as best shown in phantom outline in FIG. 1. The space between the rear upper surface of the aircraft body section 22 and the forward portion of plane section 41 defines a slot 42 through which air may flow, and the forward portion of plane section 41 and the upper rear extremity of aircraft body section 22 may be contoured to give the slot 42 the desired cross-sectional shape shown in phantom outline in FIG. 1 for the purpose set forth hereinafter.

A preferably circular rear lifting fan duct 43 extends vertically between the upper and the lower surfaces of the plane section 41 aft of the lower and rearward extremity of slot 42; the upper surface of the plane section 41 being contoured to take advantage of the lifting action provided by the reduced air pressures acting on the fan duct inlet surfaces. A rear lifting fan 44 is mounted in the circular duct 43 a short distance below the upper surface of plane section 41 for rotation in a substantially horizontal plane when aircraft 21 is in a level flight attitude.

Aircraft 21 further includes a ventral fin 45 situated in the plane of symmetry thereof dividing the flow through duct 43 and linearly connected to the lower surface of plane section 41 and the aft end 38 of aircraft body section 22 to assure directional stability of aircraft 21. Ventral fin 45 may be provided with suitable control surfaces, not shown, to facilitate roll and yaw control of aircraft 21.

Aircraft 21 further includes upper and lower transverse fences 46 extending substantially across the aft end 38 of body section 22 thereof for the purpose hereinafter set forth, as well as a plurality of vanes 47 mounted in the forward jet exit shields 37 and a plurality of vanes 48 mounted below lifting fan 44 in rear duct 43, illustrated only in FIG. 4 in the interest of clarity, to deflect the lifting jets in a desired manner for propulsion and control.

When the aircraft 21 is moving forwardly through the air in a level and normal flight attitude, the flow of the airstream thereover and through the lifting fans thereof, as indicated in FIG. 1, is optimized by the particular configuration thereof hereinbefore set forth. The vertically disposed and rearwardly arcuate cabin windshield 26, best seen in FIG. 5, taken with the sloping upper surface 27 of aircraft nose section 23, increases the flow of air into the forward lifting fan duct 33, as shown by the airstream flow lines of FIG. 1. The longitudinal fences or strakes 25 extending along the upper surface of aircraft body section 22 serve to separate another portion of the airstream to assure the passage of an adequate flow of air into the slot 42 as well as into the forward air intakes of the propulsion motors 39 and also to lend some control of cross flows, while the curve of the upper surface of the plane section 41 of assembly 24 improves the efficiency of the flow of air into the rear lifting fan duct 43, as further shown by the airstream flow lines of FIG. 1. Further, the downward and rearward slope of the relatively flat lower surface of aircraft 21 between the rounded nose thereof and the lower rear extremity of the body section 22 thereof, as indicated, improves the incremental lift on that surface.

A salient feature of the present invention is the separation of the forward lifting jets and their relatively small, outwardly directed, lateral inclination and optimized azimuth angles with respect to the body centerline. Each of the forward jet exit shields 37 serves to optimize the forward lifting jets along these lines, and considerable care must be taken in the design and mounting of the shields 37. As previously indicated, substantially longitudinal elongation of the shields 37, as well as the forward air discharge conduits 36, provides for the transverse separation of the forward lifting jets a distance equal to almost the entire width of aircraft 21 without significant reduction of the sectional area thereof. It may be found in the actual practice of the present invention that exact longitudinal alignment of the elongated axis of the forward lifting jets may not produce the most favorable results, possibly necessitating the placing of the elongated axis of the air discharge conduits 36 and the shields 37 at a small azimuth angle with respect to the plane of symmetry of aircraft 21; while the precise angle of the inclination of the forward lifting jets from the vertical may be varied somewhat from that shown in the drawings. It is not expected, however, that an aircraft constructed in accordance with the instant invention will differ substantially in this respect from the arrangement of the forward air discharge conduits 36 and jet exit shields 37 shown in the drawings.

The arrangement of the forward lifting jets of aircraft 21 hereinbefore described is considered to be particularly advantageous in that the vortices A generated by the interaction of the inboard faces of the forward lifting jets with the airstream may be utilized for aircraft lift augmentation; the degree thereof depending upon the airspeed and the distance of aircraft 21 above the ground. Each vortex A, as indicated somewhat schematically in FIGS. 1, 2, 3, and 5 of the drawings, moves rearwardly beneath the lower surface of aircraft 21 towards the lower rear extremity thereof, becoming progressively somewhat larger. The shape of each vortex A is considerably influenced by the provision of the longitudinal fences or strakes 31 and 32 carried on the lower surface of the aircraft nose section 23 and body section 22 and positioned as shown in FIGS. 1–4. The upwardly directed flow of air at the inboard extremity of each vortex A, as particularly indicated in FIGS. 2 and 3, has been found to be stronger than the downwardly directed flow of air at the outer extremity thereof; the strakes or fences 31 and 32 being partially responsible therefor. The differential between the airflow strengths acting on the body at the opposite sides of each vortex A, therefore, produces more positive pressures upon the lower surface of the body section 22 of aircraft 21, thereby considerably augmenting the lifting forces obtained. The outer vortices B produced by the interaction of the outboard faces of the forward lifting jets with the airstream are shed away from the body of aircraft 21 and therefore have no detrimental effect thereon. It is to be noted that the vortices A and B shown in FIGS. 1 and 5 have been given a rearwardly downward slope; the degree of which is dependent upon the magnitude of the forward velocity and the jet velocity.

The preferred arrangement of the rear lifting fan and motor assembly 24, as hereinbefore set forth, is also considered to be particularly advantageous. In addition to the increment of lift provided by the contouring of the upper surface of plane section 41, lift is further increased by the discharge of air flowing through slot 42 in a downwardly direction at a point directly forward of the rear lifting jet, which is circular for improved efficiency and simplicity of design. The downwardly flowing jet of air discharged by the rear circular lifting fan 44 and the slot 42, combined with the airstream flow past the upswept aft end 38 of aircraft body section 22, would normally induce a vortex system which would act on the aft end 38 of aircraft body section 22 to produce negative suction pressures thereon. The transverse strakes or fences 46 mounted on the aft end 38 of aircraft body section 22, however, serve to break up this vortex system and to partially convert the action thereof to more positive pressures on the body section aft end 38, as indicated in FIG. 1, as well as to beneficially influence the interaction of the vortices A with the rear circular lifting jet. The rear circular lifting jet, also, is so dispositioned that negative pressures created therebehind have no aircraft body surface on which to react and therefore have no appreciable influence on body lift; while the vortices C generated by the interaction of the rear circular lifting jet and the airstream, being shed away behind aircraft 21, have no effect on the forces acting thereon.

Attitudinal control of aircraft 21 may be provided by placing suitable control surfaces on ventral fin 45, as hereinbefore mentioned, as well as by the employment of such expedients as the proper deflection of vanes, not shown, which may be placed in the forward and rear lifting jets additional to the vanes 47 and 48. Additionally, roll control could also be provided by the use of suitable means to obtain differential thrust from the forward lifting jets, while pitch control could be obtained through the provision of means for producing differential thrust from the forward and rear lifting jets. Additional yaw, roll, and sideslip control could also be provided by strategically locating jets on the body of aircraft 21 supplied with compressed air ducted from the motors 39.

While forward propulsion of aircraft 21 may be partially provided for by mounting the motors 39 so that the exhaust therefrom is ejected in the proper direction, as indicated in FIG. 1, the greatest part of the work done by the motors 39 will be utilized in the driving of the forward lifting fan 35 and the rear lifting fan 44 thereof, as more fully set forth hereinafter. Accordingly, the vanes 47 mounted in the forward lifting jets and the vanes 48 mounted in the rear lifting jet are relied on to propel aircraft 21 over the ground; these vanes being mounted to swing about axes transverse to the plane of symmetry of aircraft 21 to deflect the lifting jets rearwardly for forward aircraft propulsion, downwardly for hover, and forwardly for rearward aircraft movement.

While the aicraft configuration hereinbefore set forth represents the preferred embodiment of the present invention, certain modifications may be made therein without departing from the spirit thereof. Along these lines, an alternative embodiment of the aircraft configuration according to the instant invention, generally designated by the reference numeral 49, is fragmentarily shown in FIG. 6 of the drawings. Aircraft 49 includes a body section, generally designated by the reference numeral 51, generally similar to the body section 22 of aircraft 21, and likewise carrying longitudinal strakes 32 on the lower surface thereof; the body section 51 of aircraft 49 having an aft end 52 sloping upwardly, however, at a steeper angle than the aft end 38 of the body section 22 of aircraft 21. It is contemplated, further, that the lower rear extremity of body section 51 of aircraft 49 could be positioned even more rearwardly than shown in the drawings, making the aft end 52 of aircraft body section 51 substantially vertical. Aircraft 49 further includes a rear lifting fan and motor assembly, generally designated by the reference numeral 53, situated to extend rearwardly from substantially the upper extremity of the aft end 52 of aircraft body section 51. Assembly 53 includes a propulsion motor 39 mounted at each of the sides thereof and centered substantially in the plane of a vertical side wall of aircraft body section 51, as well as a ventral fin 54 extending rearwardly from each side extremity of aircraft body section 51 aft end 52. Each ventral fin 54 is linearly connected to the under surface of a motor 39 to support the same, and each ventral fin 54 further is provided with a control surface 55 hinged at 56 along an upper edge thereof to the fin 54. Assembly 53 further includes a plane section 57 having a curved upper surface similar to that of the plane section 41 of aircraft 21 to obtain similar results; plane section 57 further having a circular rear lifting fan duct 58 extending vertically therethrough in which the rear lifting fan 59 is suitably mounted. Rear lifting fan 59 may be mounted in duct 58 by means of a suitable, conventional spider element, not shown in the interest of illustrative clarity, and suitable vanes similar to the vanes 48 of aircraft 21, also not illustrated for the same reason, are mounted in the circular rear lifting fan duct 58 below the lifting fan 59. Some degree of propulsion can also be obtained by use of a deflectable control surface 60 installed in aft end 52 of aircraft body section 51.

In aircraft 49, the rear lifting jet would be discharged in the channel formed by the aft end 52 of aircraft body section 51 and the two ventral fins 54. This arrangement would improve the pressure distribution on the aft end 52 of aircraft body section 51, while the control surfaces 55 carried on the ventral fins 54 may be operated to improve aircraft lateral control. The provision in aircraft 49 of a pair of ventral fins, moreover, would provide greater directional stability than may be obtained with a single, centrally disposed, ventral fin.

Figure 8:
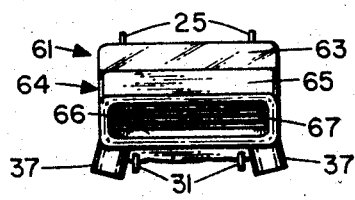
FIG. 8 is a front elevational view of the alternative aircraft nose section, taken along the line 8—8 in FIG. 7.

The aircraft configuration according to the instant invention may, if desired, be further modified as shown in FIGS. 7 and 8, in which an aircraft, generally designated by the reference numeral 61, is fragmentarily illustrated. Aircraft 61 includes a body section, generally designated by the reference numeral 62, similar to the body section 22 of aircraft 21 except for having a cabin windshield 63 sloping upwardly from front to rear and being generally straight in the transverse direction. Aircraft 61 also includes a nose section, generally designated by the reference numeral 64, having a substantially flat upper surface 65 sloping downwardly and forwardly from the lower extremity of cabin windshield 63 towards the nose of the aircraft 61 at a slighter angle than the upper surface 27 of nose section 23 of aircraft 21. The aircraft nose section 64 is also substantially chisel-shaped, similarly to the nose section 23 of aircraft 21, but is blunter; the air inlet 66 for the forward lifting fan air duct 67 extending transversely across substantially the entire front of aircraft nose section 64. The forward lifting fan 68 of aircraft 61 is mounted in the forward duct 67 at a greater angle than the forward lifting fan 35 of aircraft 21 in the interest of improved efficiency; the forward lifting fan duct 67 therebelow dividing into right and left forward air discharge conduits 69 which, at their lower ends, are similar to the lower terminus of each of the air discharge conduits 36 of aircraft 21, and which are also extended by tubular jet exit shields 37 identical to the shields 37 of aircraft 21. It is considered that an aircraft according to the present invention could be satisfactorily operated with either of the hereinbefore discussed nose section arrangements, although the nose section 23 is preferred for the reasons set forth hereinbefore.

Figure 10:
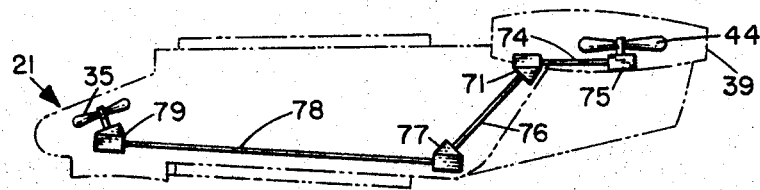
FIG. 10 is a side elevational view of the system shown in FIG. 9.

As previously mentioned, each of the motors 39 provided in an aircraft constructed in accordance with the instant invention, may be independently utilized in powering the forward and rear lifting fans thereof, although normal operation of the aircraft contemplates the operation of the motors 39 in unison. One system for transmitting power from the motors 39 to each of the lifting fans of aircraft 21 is illustrated in FIGS. 9 and 10 of the drawings; aircraft 21 and the motors 39 thereof being shown only in phantom outline. The system shown in FIGS. 9 and 10 is particularly adapted for use when motors 39 are of the turbo-shaft or other similar types including mechanical shafting, and includes a conventional power mixing and power transmission gear box 71 positioned therebetween. The system further includes a shaft 72 suitably geared to the shaft of each motor 39 and extending into gear box 71. Ideally, the motors 39 drive each of the shafts 72 at the same rotational rate; the gear box 71 effectively interconnecting the shafts 72 ordinarily requiring each of the shafts of motors 39 to turn at the same rate. Each shaft 72, however, also includes a conventional override clutch 73 operable, in the event of the failure of one of the motors 39, to effectively disengage the disabled motor from that portion of the shaft 72 extending therefrom entering the gear box 71. It will thus be seen that, in the event of the failure of a motor 39, sufficient power from the remaining motor 39 will be available for transmission to the lifting fans of aircraft 21 to permit a safe landing thereof under controlled conditions.

Power from the gear box 71 is transmitted through shaft 74 to a conventional rear gear box 75 positioned beneath the aircraft rear lifting fan 44. The shaft of rear lifting fan 44 extends upwardly from rear gear box 75 and is powered therefrom to drive the rear lifting fan 44. In the aircraft 21, the rear gear box 75 may be mounted on or interconnected with the upper edge of the ventral fin 45; and in the case of the aircraft 49, the rear gear box 75 would be supported on the conventional spider element hereinbefore mentioned upon which the rear lifting fan 59 thereof is rotatably mounted.

Power from the gear box 71 is further transmitted through shaft 76 to a conventional intermediate gear box 77 located near the lower rear extremity of the body section of aircraft 21, thence through shaft 78 to a conventional forward gear box 79, and then to the shaft element of the forward lifting fan 35 of aircraft 21 which slopes upwardly and forwardly from the forward gear box 79. This arrangement of that portion of the power transmission system powering the forward lifting fan 35 of aircraft 21 is intended to assure that the greater portion of the body section 22 thereof is kept cleared to facilitate the disposition of passengers and freight therein.

Figure 11:
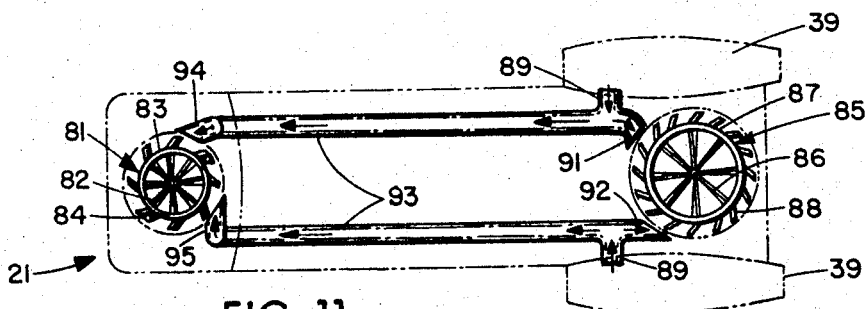
FIG. 11 is a plan view of an air duct system for driving modified aircraft lifting fans with high pressure air from the aircraft motors; and, FIG. 12 is a side elevational view of the system shown in FIG. 11.
Figure 12:
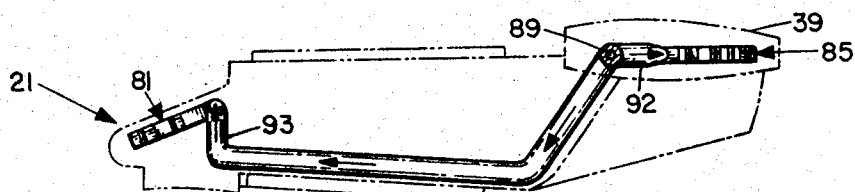

An alternative system for transmitting power from the motors 39 of aircraft 21 to the forward and rear lifting fans thereof, which must be somewhat modified in accordance therewith, is shown in FIGS. 11 and 12 of the drawings; aircraft 21 and the motors 39 thereof also being shown only in phantom outline. The modified forward lifting fan for aircraft 21, generally designated by the reference numeral 81, utilized with this power transmission system includes a plurality of conventional fan or propellor blades 82 connected at their outer extremities to a ring element 83 carrying a plurality of impellor vanes 84 at circumferentially spaced intervals on the outer cylindrical surface thereof. The aircraft rear lifting fan, generally designated by the reference numeral 85, also utilized with this power transmission system, similarly includes a plurality of conventional fan or propellor blades 86 connected at their outer extremities to a ring element 87 carrying a plurality of impellor vanes 88 at circumferentially spaced intervals on the outer cylindrical surface thereof. The air supplied by the motors 39 is utilized in driving the forward lifting fan 81 and the rear lifting fan 85; an air duct 89 bringing a flow of air from each motor 39 for this purpose. A portion of the air flowing through duct 89 from the right motor 39 is discharged through the right rear nozzle 91 against the impellor vanes 88 of rear lifting fan 85 in a direction to induce rotation thereof, as indicated in FIG. 11; and a portion of the air flowing through the other duct 89 from the left motor 39 is discharged through the left rear nozzle 92 against the impellor vanes 88 of rear lifting fan 85 in a direction to further induce rotation thereof, as indicated in FIGS. 11 and 12. The remainder of the air flowing through each of the ducts 89 is brought forwardly within aircraft 21 in right and left air ducts 93 shaped, as indicated in FIGS. 11 and 12, to substantially avoid passing through the passenger and freight carrying interior of the body section of aircraft 21 to the maximum practical extent. The air flowing through the right duct 93 is discharged through the right forward nozzle 94 against the impellor vanes 84 of the forward lifting fan 81 in a direction to induce rotation thereof, and the air flowing through the left duct 93 is discharged through the left forward nozzle 95 against the impellor vanes 84 of forward lifting fan 81 in a direction to further induce rotation thereof. Operation of both of the motors 39 simultaneously, of course, produces the transmittal of the normally required power to the lifting fans 81 and 85, but in the event of the failure of either of the motors 39 the other should transmit sufficient power to the lifting fans to permit the aircraft to be landed safely.

It is contemplated that the power transmission system shown in FIGS. 11 and 12 will ordinarily be preferred to that shown in FIGS. 9 and 10 in the actual practice of the present invention as being simpler and lighter in weight.

It is further contemplated that suitable means may be provided in the aircraft configuration herein disclosed to interconnect the motors thereof with the landing gear wheels thereof for roadability.

Obviously, many modifications and variations of the present invention are possible in the light of the foregoing teachings.

What is claimed as new and desired to be secured by Letters Patent of the United States is:

1. A vehicle capable of three dimensional movement through a fluid medium, comprising:
   (a) a nose section including a forward duct having a fluid inlet, said forward duct being divided within said nose section into a right forward fluid discharge conduit leading to a right forward jet exit situated in the vicinity of the right lower extremity of said nose section and a left forward fluid discharge conduit leading to a left forward jet exit situated in the vicinity of the left lower extremity of said nose section, said nose section further including a forward lifting fan substantially transversely rotatably mounted in said forward duct between said inlet and the point where said forward duct is divided into said right and left discharge conduits;
   (b) a body section adapted to interiorly carry a payload extending rearwardly from said nose section;
   (c) a rear lifting fan and motor assembly substantially cantilevered rearwardly from the upper rear extremity of said body section, said assembly including a plane section having a rear duct extending substantially vertically therethrough and also having a rear lifting fan substantially transversely rotatably mounted in said rear duct, said assembly further including at least one motor mounted adjacent the upper rear extremity of said body section; and,
   (d) means for transmitting power from said motor to each of said lifting fans whereby each of said lifting fans may be rotatably driven by operation of said motor.

2. The vehicle according to claim 1, wherein said nose section and said body section have substantially flat, coplanar, lower surfaces sloping downwardly and rearwardly from the nose of said vehicle towards the lower rear extremity of said body section, said lower surface of said body section carrying a longitudinal strake situated near each side extremity thereof for optimizing the inner vortices generated beneath said vehicle by the interaction of the fluid discharge through said forward jet exits with the main fluid stream when said vehicle moves forwardly through said fluid medium to increase vehicle lift.

3. The vehicle according to claim 1, wherein said plane section of said assembly is separated from the upper rear extremity of said body section over a substantial portion of the width thereof to define a slot through which fluid flowing rearwardly over the upper surface of said body section may pass to be discharged in a substantially downward direction at a point somewhat forwardly of said rear duct for lift augmentation, and wherein said body section includes a substantially flat, transom-like aft end sloping upwardly and rearwardly from the lower rear extremity of said body section towards the upper rear extremity thereof carrying at least one strake extending transversely thereacross for breaking up the vortex induced by the flow from said rear duct and said slot interacting with the main fluid stream flow past the aft end of said body section and for partially converting negative pressures to more positive pressures.

4. The vehicle according to claim 1, wherein said assembly includes a second motor mounted adjacent the upper rear extremity of said body section, said one motor and said second motor each extending along a separate longitudinal edge of said plane section, and wherein said vehicle further includes means for transmitting power from said second motor to each of said lifting fans whereby each of said lifting fans may be rotatably driven by operation of said second motor.

5. The vehicle according to claim 1, wherein vanes are transversely rotatably mounted adjacent each of said forward jet exits and beneath said rear lifting fan for selectively deflecting fluid discharged through said forward jet exits and said rear duct in a downwardly and rearwardly direction for forwardly propelling said vehicle through said fluid medium, in a downwardly direction for causing said vehicle to hover in said fluid medium, and in a downwardly and forwardly direction for rearwardly propelling said vehicle through said fluid medium.

6. An aircraft of the type having short and vertical takeoff and landing capabilities, comprising:
   (a) a somewhat chisel-shaped nose section having a downwardly and forwardly sloping upper surface and a downwardly and rearwardly sloping, substantially flat, lower surface, said nose section including a forward duct having an air inlet, said forward duct being divided within said nose section into a right forward air discharge conduit leading to a right forward jet exit situated in the vicinity of the right lower extremity of said nose section and a left forward air discharge conduit leading to a left forward jet exit situated in the vicinity of the left lower extremity of said nose section, said nose section further including a forward lifting fan substantially transversely rotatably mounted in said forward duct between said air inlet and the point where said forward duct is divided into said right and left air discharge conduits, each of said right and left forward jet exits being extended beyond the confines of said nose section by a longitudinally elongated tubular shield mounted therearound upon said nose section, each of said shields further being inclined in a laterally outwardly direction with respect to the aircraft plane of symmetry for discharging air flowing therethrough in an outwardly as well as downwardly direction;
   (b) a somewhat box-like body section adapted to interiorly carry a payload extending rearwardly from said nose section, said body section having a substantially flat upper surface disposed at a higher level than the upper rear extremity of said nose section upper surface and including a windshield extending between the forward extremity of said body section upper surface and said upper rear extremity of said nose section upper surface, said body section having a substantially flat, downwardly and rearwardly sloping lower surface coplanar with said nose section lower surface;
   (c) a rear lifting fan and motor assembly substantially cantilevered rearwardly from the upper rear extremity of said body section, said assembly including a plane section having a rear duct extending substantially vertically therethrough and also having a rear lifting fan substantially transversely rotatably mounted in said rear duct, said assembly further including at least one motor mounted adjacent the upper rear extremity of said body section; and,
   (d) means for transmitting power from said motor to each of said lifting fans whereby each of said lifting fans may be rotatably driven by operation of said motor.

7. The aircraft according to claim 6, wherein said assembly includes a second motor mounted adjacent the upper rear extremity of said body section, said one motor and said second motor each extending along a separate longitudinal edge of said plane section, and wherein said aircraft further includes means for transmitting power from said second motor to each of said lifting fans whereby each of said lifting fans may be rotatably driven by operation of said second motor.

8. The aircraft according to claim 7, wherein vanes are transversely rotatably mounted in each of said forward jet exit shields and beneath said rear lifting fan for selectively deflecting air discharged through said forward jet exits and said rear duct in a downwardly and rearwardly direction for forwardly propelling said aircraft through the air, in a downwardly direction for causing said aircraft to hover in the air, and in a downwardly and forwardly direction for rearwardly propelling said aircraft through the air.

9. The aircraft according to claim 8, wherein said body section lower surface carries a longitudinal strake situated near each side extremity thereof for optimizing the inner vortices generated beneath said aircraft by the interaction of the air flowing from said forward jet exits with the main airstream when said aircraft moves forwardly through the air for lift augmentation.

10. The aircraft according to claim 9, wherein said forward duct air inlet is located on said upper surface of said nose section, and wherein said body section carried winshield is rearwardly curved and substantially vertically disposed for improving the flow of air into said forward duct air inlet.

11. The aircraft according to claim 9, wherein said plane section of said assembly has an upper surface curved to improve the flow of air into said rear duct, wherein said plane section of said assembly is separated from the upper rear extremity of said body section over a substantial portion of the width thereof to define a slot through which air flowing rearwardly over the upper surface of said body section may pass to be discharged in a substantially downward direction at a point somewhat forwardly of said rear duct for lift augmentation, and wherein said body section includes a substantially flat, transom-like aft end sloping upwardly and rearwardly from the lower rear extremity of said body section towards the upper rear extremity thereof carrying at least one strake extending transversely thereacross for breaking up the vortex induced by the flow from said rear duct and said slot interacting with the main airstream flow past the aft end of said body section and for partially converting negative pressures to more positive pressures, said aircraft further including a ventral fin extending centrally downwardly beneath said plane section and rearwardly from said body section aft end for providing aircraft directional stability.

12. The aircraft according to claim 9, wherein said plane section of said assembly has an upper surface curved to improve the flow of air into said rear duct, and wherein said body section includes a substantially flat, transom-like aft end carrying a control surface moveable to further rearwardly deflect the air flow from said rear duct for increasing aircraft forward propulsion, said aircraft further including a ventral fin extending rearwardly from said body section aft end at each of the side edges thereof and downwardly beneath each side extremity of said rear lifting fan and motor assembly for providing aircraft directional stability, each of said ventral fins carrying a control surface moveable to improve aircraft lateral control.

13. The aircraft according to claim 9, wherein each of said lifting fans includes a plurality of radially extending blades connected at their outer ends to a ring element carrying a plurality of circumferentially spaced impellor vanes on the outer surface thereof, and wherein said means for transmitting power from each of said motors to each of said lifting fans includes ducting for bringing compressed air from each of said motors toward each lifting fan as well as nozzle means for discharging the air brought through said ducting from each of said motors against said impellor vanes carried by each of said lifting fans.

References Cited
UNITED STATES PATENTS
3,065,936 11/1962 Messerschmitt _____ 244—23
3,276,528 10/1966 Tucknott et al. ____ 244—12 X
3,342,278 9/1967 Cocksedge _____ 244—12 X

FOREIGN PATENTS
189,445 5/1964 Sweden.

MILTON BUCHLER, *Primary Examiner.*
THOMAS W. BUCKMAN, *Assistant Examiner.*

U.S. Cl. X.R.
244—55